United States Patent [19]
Moore et al.

[11] Patent Number: 5,988,950
[45] Date of Patent: Nov. 23, 1999

[54] METHOD AND SYSTEM FOR PREVENTING UPWARD MIGRATION OF CONTAMINANTS IN SOIL

[75] Inventors: Terry J. Moore, Plano; Charles T. Roberts, Richardson, both of Tex.

[73] Assignee: Atlantic Richfield Company, Los Angeles, Calif.

[21] Appl. No.: 08/972,847

[22] Filed: Nov. 18, 1997

[51] Int. Cl.⁶ .............................. C09K 17/00; E02D 3/12
[52] U.S. Cl. .................. 405/263; 405/264; 405/266; 405/268
[58] Field of Search ...................... 405/263–270

[56] References Cited

U.S. PATENT DOCUMENTS

| | | | |
|---|---|---|---|
| 2,300,325 | 10/1942 | Van Leeuwen | 405/264 |
| 2,319,020 | 5/1943 | Van Leeuwen | 405/264 |
| 2,329,148 | 9/1943 | Van Leeuwen | 405/264 X |
| 3,121,973 | 2/1964 | Phillips et al. | 405/264 X |
| 3,379,014 | 4/1968 | Phillips et al. | 405/264 |
| 3,520,140 | 7/1970 | Katzer | 405/264 |
| 3,789,613 | 2/1974 | Routson | 405/264 |
| 5,372,462 | 12/1994 | Sydansk | 405/264 |
| 5,462,390 | 10/1995 | Sydansk | 405/264 |
| 5,500,245 | 3/1996 | Toushin | 405/264 X |
| 5,520,482 | 5/1996 | Oeste et al. | 405/264 X |

FOREIGN PATENT DOCUMENTS 832216  1/1970  Canada .

OTHER PUBLICATIONS

Das, Braja M., Principles of Geotechnical Engineering, Third Edition, PWS Publishing Company, pp. 200–201, 1985.

*Primary Examiner*—William Neuder
*Assistant Examiner*—Tara L. Mayo
*Attorney, Agent, or Firm*—F. Lindsey Scott

[57] ABSTRACT

A system for preventing upward migration of contaminants in soil having capillary pores defined therein, the system comprising the soil and a hydrophobic substance applied to the soil, the substance being attracted to enter the capillary pores so that a barrier is formed which, under unsaturated soil conditions, prevents the upward migration of contaminants carried by water through the capillary pores in the soil.

20 Claims, 4 Drawing Sheets

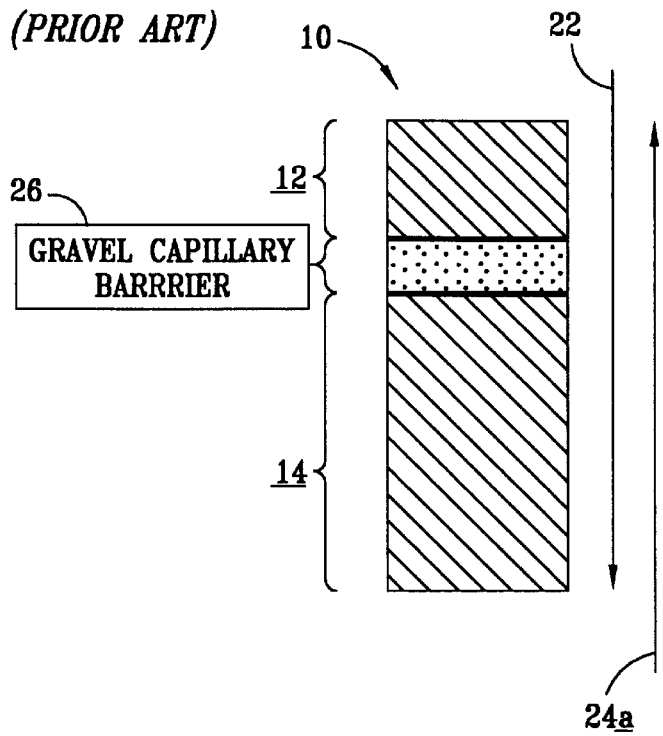
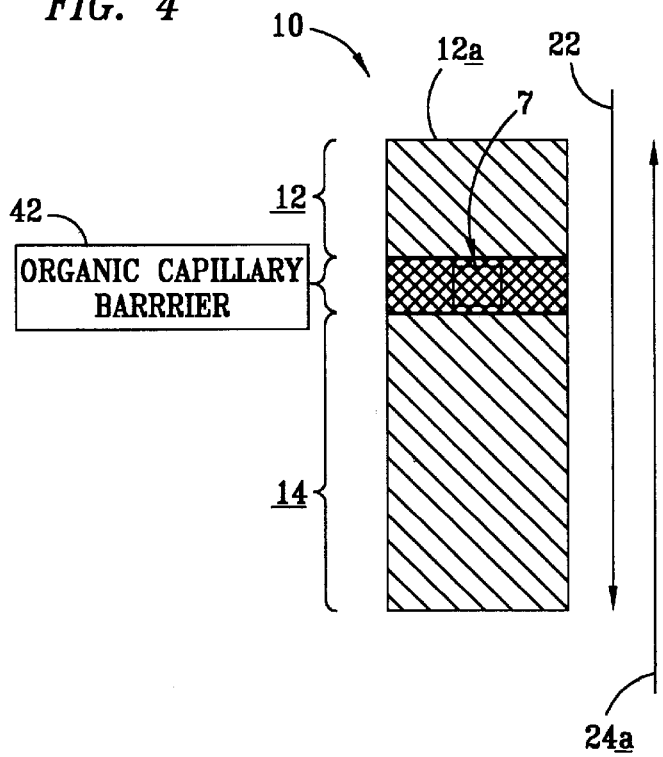

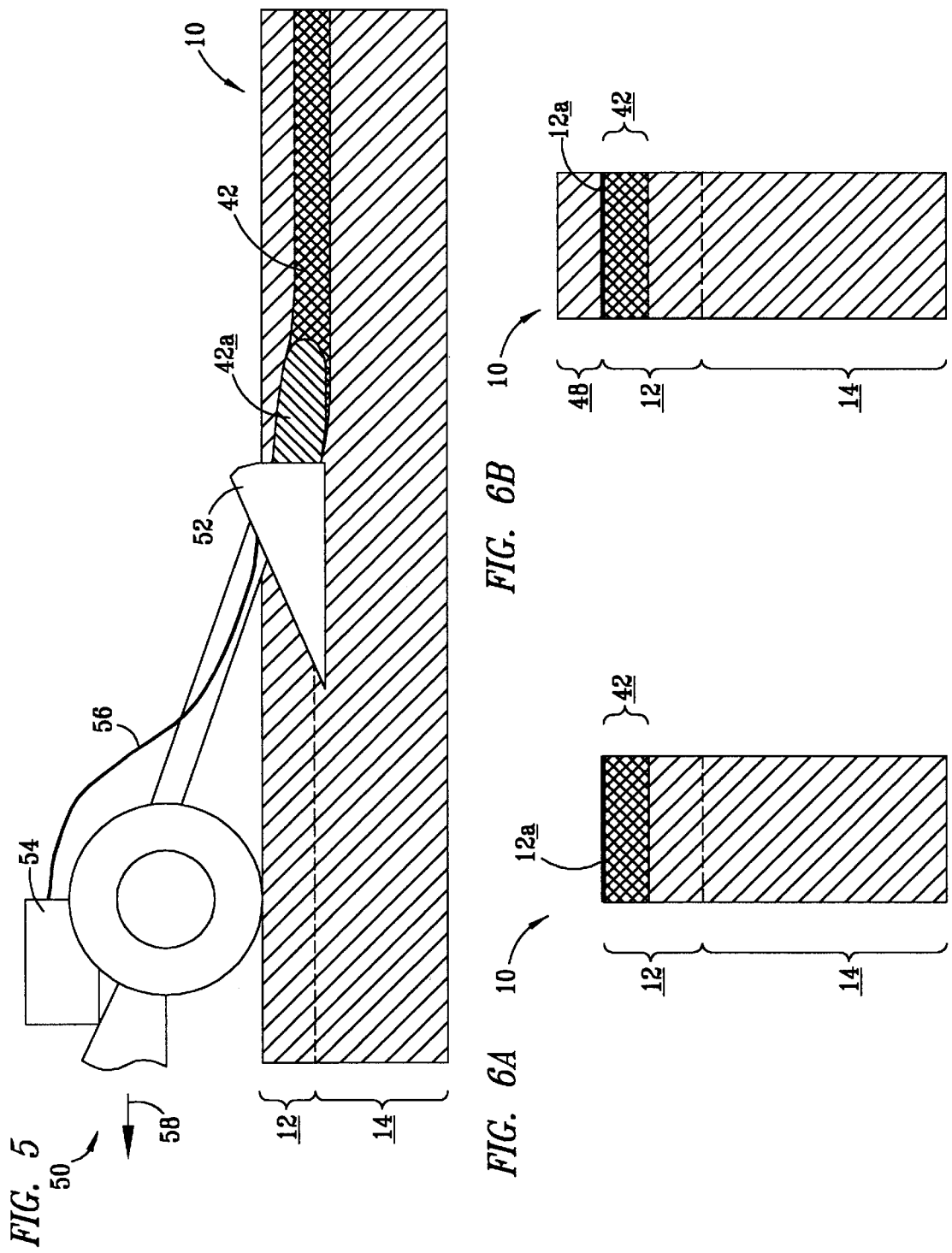

1

METHOD AND SYSTEM FOR PREVENTING UPWARD MIGRATION OF CONTAMINANTS IN SOIL

FIELD OF THE INVENTION

The invention relates generally to barriers to prevent contaminant migration in soil and, more particularly, to hydrophobic capillary barriers to prevent contaminant migration in soil under unsaturated flow conditions.

BACKGROUND OF THE INVENTION

With reference to FIG. 1 of the drawings, the reference numeral 10 generally designates a cross-section of soil which has been contaminated with a water soluble contaminant. One such contaminant may be produced water from oil field operations, which water may contain brine and other water soluble contaminants. The soil 10 is comprised of surface soil 12 having a thickness of about six to twenty-four inches, and subsoil 14 which lies beneath the surface soil. A portion of the interface between the surface soil 12 and the subsoil 14 is identified by the reference numeral 2. As shown in FIG. 2 in an enlargement of the portion 2 of the soil 10, the surface soil 12 and the subsoil 14 each comprise soil particles 16 naturally arranged so as to define relatively large macropores 18, and relatively small capillary pores 20 which constitute a continuum extending between the surface soil and the subsoil.

When the soil 10 is saturated with water (i.e., the macropores 18 are filled with water, not shown), for example, after irrigation or precipitation such as natural rainfall, water migrates downwardly from the surface soil 12 primarily through the macropores 18 into the subsoil 14, as indicated by the arrow 22 in FIG. 1. If dissolved contaminants (not shown) such as salts, acids, bases, metals, organic substances, and the like are in the surface soil 12, then the contaminants are carried by the water into, or through, the subsoil 14 where the contaminants have little effect on vegetation (not shown) that may be present in the surface soil.

During dry periods, when evaporation and transpiration rates exceed precipitation rates, water evaporates and transpires from the surface soil 12, leaving the surface soil dryer than the subsoil 14. Under these types of unsaturated conditions (i.e., when the macropores 18 contain air instead of water) water may migrate upwardly from the subsoil 14 through the continuum of capillary pores 20 to the surface soil 12, as indicated by the arrow 24 in FIG. 1, rather than downwardly through the macropores 18, as indicated by the arrow 22 in FIG. 1. Dissolved contaminants in the subsoil 14 are then carried upwardly with the water into the surface soil 12, where the water evaporates, resulting in an accumulation and increased concentration of contaminants in the surface soil. The presence of such contaminants in the surface soil 12 inhibits the growth of vegetation and accelerates erosion of the soil and is, accordingly, detrimental to a number of different land management schemes, including agriculture, oil and gas production, mining, land farming, highway right-of-way management, and the like.

Barriers may be created to prevent the upward capillary migration of water and dissolved contaminants in unsaturated soil. The most common type of barrier utilized comprises a layer of clean gravel 26, with very few fines, positioned in the soil 10, as depicted in FIG. 3, at a selected depth and generally substantially between the surface soil 12 and the subsoil 14. Because the gravel 26 does not include capillary pores necessary to sustain the unsaturated migration of water from the subsoil 14 to the surface soil 12, the continuity of capillary pores 20 necessary to sustain capillary migration of water in the soil 10 is broken. Therefore, water and contaminants in the subsoil 14 cannot migrate upwardly from the subsoil 14 through the capillary pores 20 to the surface soil 12, as indicated by the shortened arrow 24a. Water and contaminants can, however, continue to migrate downwardly from the surface soil 12 through the gravel barrier 26 to the subsoil 14, as indicated by the arrow 22. Gravel barriers have a number of drawbacks. For example, gravel barriers require a poorly-graded gravel with minimal fines to be effective and, furthermore, are usually economically and technically impractical for soil remediation. Additionally, if it is ever desirable to remove the gravel barrier, such removal is even more economically and technically impractical than laying the barrier.

Therefore, what is needed is an economic and practical system and method for creating a barrier that prevents the upward capillary migration of contaminants in soil, and that is readily removable.

SUMMARY OF THE INVENTION

The present invention provides an economic and practical system and method for creating a barrier that prevents the upward migration of contaminants in soil having capillary pores defined in the soil, and that is readily removable. Accordingly, the system of the present invention comprises the soil and a hydrophobic substance applied to the soil, the substance being attracted to enter the capillary pores so that a barrier is formed which, under unsaturated soil conditions, prevents the upward migration of contaminants carried by water through the capillary pores in the soil.

The method of the present invention comprises applying a hydrophobic substance to the soil, and permitting the hydrophobic substance to be adsorbed in and occupy the capillary pores of the soil so that a barrier is formed which, under unsaturated soil conditions, excludes water and prevents the upward migration of contaminants carried by water through the capillary pores.

BRIEF DESCRIPTION OF THE DRAWINGS

FIG. 3 is an elevational cross-sectional view of the section of soil shown in FIG. 1 with a gravel barrier to stop capillary migration according to the prior art.

FIG. 4 is an elevational cross-sectional view of a section of soil embodying a capillary barrier in accordance with the present invention.

FIG. 5 is an elevational cross-sectional view of a portion of soil illustrating a method for applying a capillary barrier.

FIGS. 6A and 6B are elevational cross-sectional views of a portion of soil illustrating an alternative method for applying a capillary barrier.

DESCRIPTION OF THE PREFERRED EMBODIMENTS

In the discussion of the Figures. the same numbers will be used throughout to refer to the same or similar components.

Figure 1:
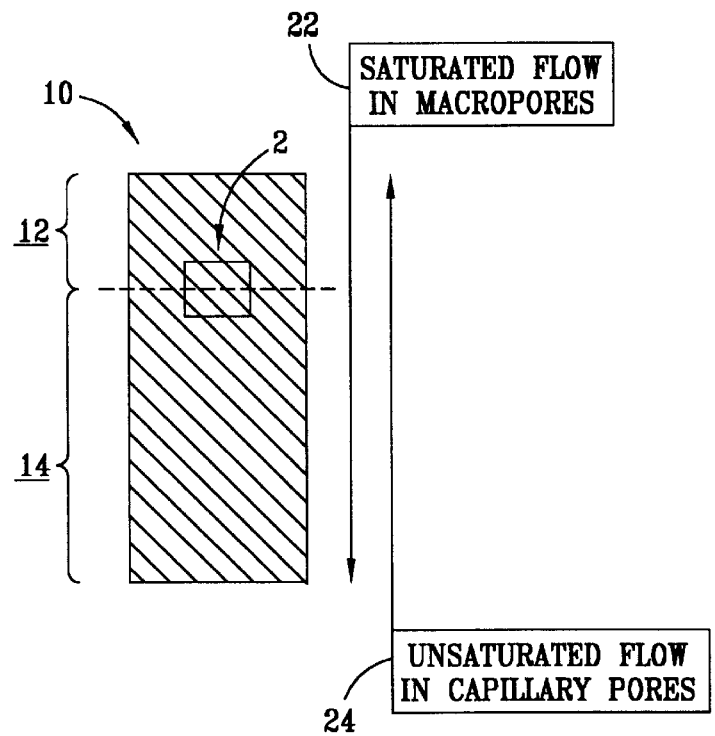
FIG. 1 is an elevational cross-sectional view of a section of soil according to the prior art.
Figure 2:
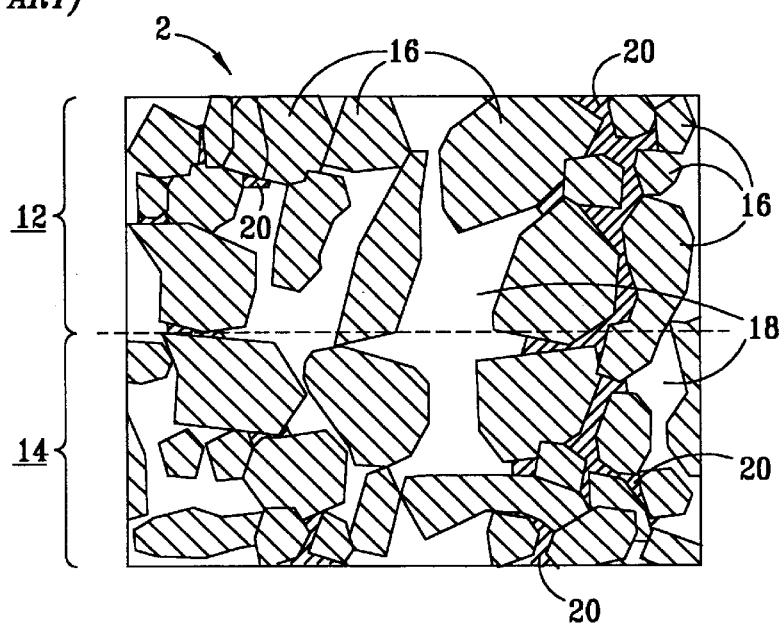
FIG. 2 is an enlarged view of a portion of the soil of FIG. 1 taken within the enclosure 2 of FIG. 1 according to the prior art.

With reference to FIG. 4 of the drawings, the reference numeral 10 generally designates a cross-section of a section of soil, such as produced-water impacted soil, which, as described above with respect to FIGS. 1 and 2, comprises surface soil 12 having a thickness of approximately six to twenty-four inches, and subsoil 14 which lies beneath the surface soil. Referring back to FIG. 2, the surface soil 12 and the subsoil 14 each comprise soil particles 16 naturally arranged to define relatively large macropores 18 and relatively small capillary pores 20 which constitute a continuum extending between the surface soil and the subsoil.

In accordance with the present invention, a capillary barrier 42 is positioned in the soil 10, in a manner described below, at a selected depth, typically above or proximate to the interface between the surface soil 12 and the subsoil 14, such as from about one to about thirty-six inches and, typically about twelve to about twenty-four inches and, preferably, about twelve inches. The capillary barrier 42 comprises a suitable organic or inorganic hydrophobic substance selected from the group consisting of a foam or liquid polymer, petroleum oil, vegetable oil, mineral oil, silicon oil, and the like. The thickness of the capillary barrier 42 and the quantity of hydrophobic substance used in the barrier is determined based on the hydrology and other properties of the soil. For example, the barrier 42 may have a thickness of about one to about twelve or more inches and, typically, about three to about nine inches and, preferably, about six inches. A sub-element 7 of the capillary barrier 42, depicted in FIG. 4, will be described below with respect to FIGS. 7 and 8.

FIG. 5 illustrates a method of the present invention for positioning the capillary barrier 42 in the soil 10. In accordance with this method, a wheeled or tracked vehicle 52 (only a portion of which vehicle is shown in FIG. 5) is provided with a conventional agricultural implement, such as a disc or opening plow 50, attached to the vehicle in a conventional manner. A container 56 of hydrophobic substance for forming the capillary barrier 42 is mounted to the vehicle, and a hose 54 is connected between the container 56 and the plow 50. The plow 50 is then pulled by the vehicle 52 through the soil 10 at the selected depth, as discussed above, in the direction of the arrow 58, and the hydrophobic substance, designated by the reference numeral 42a, is pumped through the hose 54 and injected directly into the soil 10 to form an in situ capillary barrier 42.

In an alternate method of the present invention, depicted in FIG. 6A, a film of the hydrophobic substance forming the capillary barrier 42 is applied to the surface 12a of the surface soil 12. The film of hydrophobic substance may be applied to the surface 12a using any suitable technique, such as by spraying the hydrophobic substance from a wheeled or tracked vehicle (not shown), from an irrigation system (not shown), or the like. The quantity of the hydrophobic substance in the film of hydrophobic substance should be sufficient so that, when applied to the surface 12a, it will migrate downwardly through the soil 10 and enter into the capillary pores 20 to form the capillary barrier 42 with the desired thickness, discussed above. Conventional agricultural construction equipment (not shown) is then utilized to lay a layer of top soil 48 over the surface 12a of the surface soil 12, as shown in FIG. 6B, and to re-vegetate the soil 10 in a manner well known in the art. Though the top soil 48 is substantially uncontaminated, it may otherwise be composed of substantially the same elements as the surface soil 12, and may have a thickness of, for example, from about one-half foot to three feet and, typically about one-half foot to two feet and, preferably, about one foot.

Figure 7:
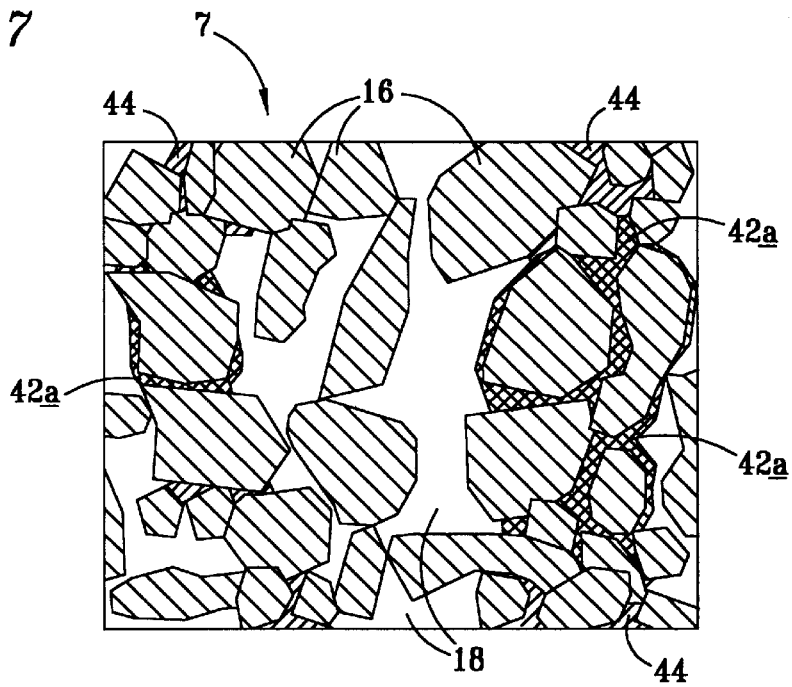
FIGS. 7 and 8 are enlarged views of a portion of the soil of FIG. 4 taken within the enclosure 7 of FIG. 4 under unsaturated and saturated conditions, respectively.

In the operation of the present invention, and with reference to FIGS. 4 and 7, once the capillary barrier 42 is applied to the soil 10 using one of the methods described above, then, as a result of natural adsorptive forces, the hydrophobic substance 42a enters, occupies, and is held in the capillary pores 20, thereby occupying a portion of the surrounding areas, and leaving the macropores 18 substantially void of the hydrophobic substance. When the capillary pores 20 are filled with the hydrophobic substance 42a, water is excluded from the capillary pores 20, thereby preventing water, designated by the reference numeral 44 in FIG. 7, and contaminants carried by the water, from migrating upwardly under unsaturated conditions from the subsoil 14 through the capillary pores 20 to the surface soil 12 and, with respect to FIG. 6B, to the top soil 48.

Figure 8:
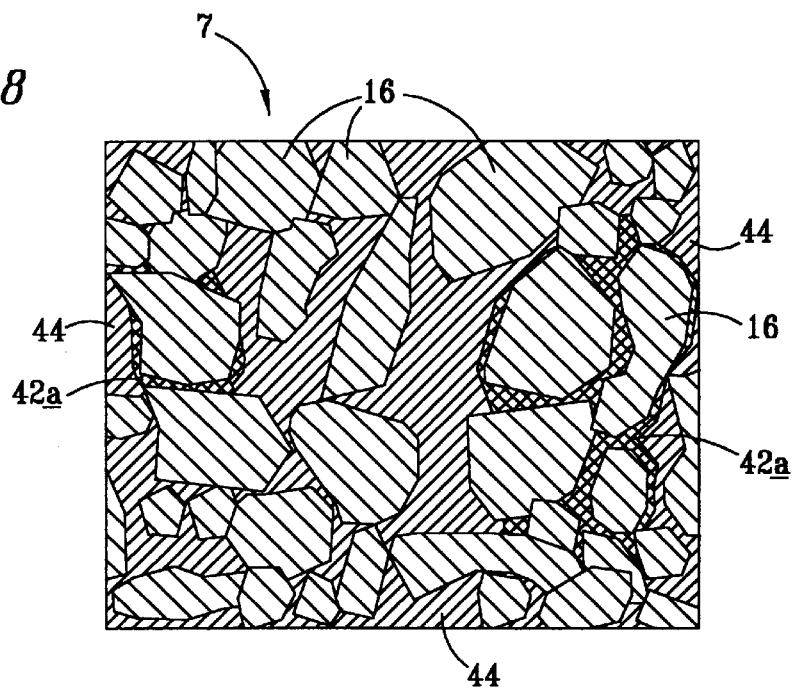

With reference to FIGS. 4 and 8, it can be appreciated that because the macropores 18 are substantially void of the hydrophobic substance 42a, the flow of water through the macropores 18 is substantially unaffected by the capillary barrier 42. Therefore, as depicted in FIG. 8, when the soil 10 becomes saturated with the water 44 received, for example, from irrigation or precipitation, such as natural rainfall, the water will migrate downwardly, due to the influence of gravity, through the macropores 18. Contaminants in the surface soil 12 and top soil 48 (FIG. 6B) are carried, or leached, downwardly with the water 44 from the surface soil through the macropores 18 to the subsoil 14. Thus, while the capillary barrier 42 prevents contaminates from moving upwardly when the soil 10 is unsaturated, as indicated by the arrow 24a in FIG. 4, the contaminants continue to be leached from the surface soil 12 and top soil 48 (FIG. 6B) to the subsoil 14 when the soil 10 is saturated with the water 44, as indicated by the arrow 22.

It can be further appreciated that, when the capillary barrier 42 is created using an organic substance, it will naturally biodegrade over the course of time, for example, after a few years, depending on the chemicals selected to constitute the barrier 42. This provides the present invention with a significant advantage over the prior art use of the gravel barrier 26, described above with respect to FIG. 3, because to remove a gravel barrier, the surface soil 12 and a portion of the subsoil 14 must be removed and the top soil put back in place. Such a process is, in many cases, economically and technically impractical. As a result, the total cost to install or remove the gravel barrier 26 can be an order of magnitude greater (i.e., on the order of ten times greater) than the total cost to install and remove the capillary barrier 42 of present invention.

It can be still further appreciated that the gravel barrier 26 provides a horizontal drainage channel which, in some cases would be unwanted. This provides the capillary barrier 42 of the present invention with an additional advantage over the gravel barrier 26 since the capillary barrier does not provide a channel for such unwanted horizontal drainage.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A system for preventing upward migration of water soluble contaminants in soil containing capillary pores, the system comprising:

the soil; and a hydrophobic substance positioned in the soil, the substance being attracted to enter the capillary pores in the soil so that a barrier is formed in the capillary pores which, under unsaturated soil conditions, prevents the upward migration of water soluble contaminants carried by water through the capillary pores in the soil and which under saturated soil conditions permits downward flow of water through macropores in the soil.

2. The system of claim 1 wherein the soil comprises surface soil; and subsoil underlying the surface soil; and wherein the capillary pores are defined in and extend between the surface soil and the subsoil.

3. The system of claim 1 wherein the soil comprises particles and macropores arranged so that, when the soil is saturated, water may carry contaminates downwardly through the macropores.

4. The system of claim 1 wherein the hydrophobic substance is selected from the group consisting of foam polymers, liquid polymers, petroleum oil, vegetable oil, mineral oil, and silicon oil.

5. The system of claim 1 wherein the hydrophobic substance is organic.

6. The system of claim 1 wherein the hydrophobic substance is inorganic.

7. The system of claim 1 wherein the hydrophobic substance is oil.

8. The system of claim 1 wherein the hydrophobic substance is biodegradable.

9. A method for preventing upward migration of water soluble contaminants in soil containing capillary pores, the method comprising the steps of:

applying a hydrophobic substance to the soil; and forming a barrier in the capillary pores by positioning a sufficient quantity of the hydrophobic substance in the capillary pores to prevent the upward migration of water soluble contaminants carried by water through the capillary pores while permitting the flow of water downwardly through the soil at saturated conditions through macropores in the soil.

10. The method of claim 9 wherein the step of applying a hydrophobic substance further comprises the steps of:

positioning a plow in the soil;

pulling the plow through the soil at a selected depth; and injecting the hydrophobic substance from the plow into the soil.

11. The method of claim 9 wherein the step of applying a hydrophobic substance further comprises the step of applying a film of the hydrophobic substance to the surface of the soil.

12. The method of claim 11 wherein the soil is a first soil and the method further comprises the step of laying a second soil over the first soil after forming the barrier.

13. The method of claim 9 further comprising the step of re-vegetating the soil after forming the barrier.

14. The method of claim 9 wherein the soil comprises surface soil; and subsoil underlying the surface soil; and wherein the capillary pores are defined in and extend between the surface soil and the subsoil.

15. The method of claim 9 wherein the soil comprises particles and macropores, and wherein the method further comprises the step of selecting a hydrophobic substance which is attracted to the capillary pores and which substantially does not remain in the macropores so that, when the soil is saturated, water may carry contaminates downwardly through the macropores.

16. The method of claim 9 wherein the hydrophobic substance is selected from the group consisting of foam polymers, liquid polymers, petroleum oil, vegetable oil, mineral oil, and silicon oil.

17. The method of claim 9 wherein the hydrophobic substance is organic.

18. The method of claim 9 wherein the hydrophobic substance is inorganic.

19. The method of claim 9 wherein the hydrophobic substance is oil.

20. The method of claim 9 wherein the hydrophobic substance is biodegradable.

\* \* \* \* \*